(12) United States Patent
Oka et al.

(10) Patent No.: US 6,655,140 B2
(45) Date of Patent: Dec. 2, 2003

(54) FLUID PRESSURE BOOSTING DEVICE

(75) Inventors: Hiroyuki Oka, Higashimatsuyama (JP); Masahiro Shimada, Higashimatsuyama (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 67 days.

(21) Appl. No.: 10/121,714

(22) Filed: Apr. 15, 2002

(65) Prior Publication Data
US 2002/0152883 A1 Oct. 24, 2002

(30) Foreign Application Priority Data
Apr. 18, 2001 (JP) ........................................ 2001-119707

(51) Int. Cl.[7] ................................................. F15B 9/10
(52) U.S. Cl. ........................................ 60/554; 91/369.2
(58) Field of Search .......................... 91/369.2, 376 R; 60/554, 547.1

(56) References Cited

U.S. PATENT DOCUMENTS

| | | | |
|---|---|---|---|
| 4,274,326 A | * | 6/1981 | Peeples ...................... 91/369.2 |
| 4,341,076 A | * | 7/1982 | Steffes ....................... 60/547.1 |
| 4,642,990 A | * | 2/1987 | Mizusawa et al. ............ 60/554 |
| 4,656,923 A | * | 4/1987 | Tsuyuki et al. ............ 60/547.1 |

* cited by examiner

*Primary Examiner*—Edward K. Look
*Assistant Examiner*—Michael Leslie
(74) *Attorney, Agent, or Firm*—Kanesaka & Takeuchi

(57) ABSTRACT

In a fluid pressure boosting device 1 of the present invention, a control valve 4 is composed of a supply valve 44 and a discharge valve 45, the supply valve 44 comprises an annular valve cone 46 of a poppet type and a first valve seat 7 and the discharge valve 45 comprises an annular valve cone 46 of a poppet type and a second valve seat 8. Inside a rear end portion of a primary piston 21 of a master cylinder 2, a reaction disk 57 made of an elastic material such as rubber is fitted. An input shaft 3 penetrating the control valve is arranged such that, in the inoperative state, an end thereof confronts the reaction disk 57 with a predetermined space therebetween and, in the operative state, the end comes in contact with said reaction disk 57 so that a reaction force is transmitted to the input shaft 3. The passage for discharging hydraulic fluid of the power chamber 9 is composed of annular passages 52, 53. Therefore, a fluid pressure boosting device of a center valve type can be provided of which the structure for attaining the jumping characteristic and the structure of passage for discharging hydraulic fluid are simple.

4 Claims, 4 Drawing Sheets

FLUID PRESSURE BOOSTING DEVICE

BACKGROUND OF THE INVENTION

The present invention relates to a fluid pressure boosting device, which boosts operating force exerted on an operating means with working fluid pressure into predetermined magnitude to output boosted force and, more particularly, to a fluid pressure boosting device with a so-called jumping characteristic.

For example, fluid pressure boosting device is employed in a brake fluid pressure boosting device of a type utilized in brake systems of automotive vehicles. Such a brake fluid pressure boosting device is for boosting pedaling force on a brake pedal into predetermined magnitude to output. The output of the brake fluid pressure boosting device actuate a master cylinder so that the master cylinder develops master cylinder pressure corresponding to the output of the brake fluid pressure boosting device. The master cylinder pressure is supplied to wheel cylinders, thereby actuating brakes.

Among conventional brake fluid pressure boosting devices, a brake fluid pressure boosting device of a center-valve type with a so-called jumping characteristic is known in which a control valve is located in a power piston. According to the jumping characteristics, as shown in FIG. 3, little or none output is produced until loss stroke in the brake system is cancelled so that substantial brake pressure is attained after, while large output is produced when substantial brake pressure is attained after loss stroke in the brake system is cancelled. Because of the jumping characteristic, the braking pressure boosting device can output braking pressure well corresponding to the input as compared to a device without jumping characteristic as shown by a dotted line of FIG. 3.

As an example of conventional brake fluid pressure boosting devices having the aforementioned jumping characteristic is disclosed in Japanese Unexamined Patent Publication No. 2000-177576.

FIG. 4 is a sectional view showing a brake fluid pressure boosting device and a tandem-type master cylinder disclosed in the above publication. The master cylinder is actuated by output of the brake fluid pressure boosting device. Detail explanation of components and actions of the brake fluid pressure boosting device and the master cylinder will be omitted because these should be understood upon a reading of the publication. The components and actions will be just simply explained.

When any braking action is not taken as shown in FIG. 4, in the brake fluid pressure boosting device 1 and the master cylinder 2, a brake pedal (not shown) is not depressed so that an input shaft 3 connected to the brake pedal does not travel and a control valve 4 is thus in its inoperative state as shown in FIG. 4. That is, a valve ball 5 of the control valve 4 is seated on a first valve seat 7 fixed to a power piston 6 and is spaced apart from a second valve seat 8 disposed on an end of a cylindrical member 8a connected to the input shaft 3 integrally. Therefore, a power chamber 9, which is always in communication with a second-valve-seat-side portion of the cylindrical member 8a, communicates with a booster reservoir (not shown) through a space between the valve ball 5 and the second valve seat 8, an axial hole 10 formed in the cylindrical member 8a, an axial hole 11 and a radial hole 12 formed in the input shaft 3, a radial hole 14 formed in a plug 13, an axial hole 16 formed in a housing 15, and a discharge port 17. Hydraulic fluid introduced from a fluid pressure source (not shown) through an input port 18 is not supplied to the power chamber 9. Therefore, the power piston 6 is not actuated and the brake fluid pressure boosting device 1 outputs nothing.

The right end 19a of a reaction piston 19 which is slidably fitted around the input shaft 3 is spaced apart from a step 3a of the input shaft 3. In addition, a flange (stopping portion) 20a of a cylindrical stopper member 20 connected to the input shaft 3 is in contact with an end 13b of a cylindrical projection 13a of the plug 13 and is spaced apart from a stopper 19c of a first flange 19b of the reaction piston 19. That is, the flange 20a of the cylindrical stopper member 20 is in a position advanced relative to the stopper 19c.

The master cylinder 2 is also not operated. In this state, a radial hole 22 formed in a primary piston 21 is positioned behind a cup seal 23 so that a primary chamber 24 communicates with a master-cylinder reservoir 27 through the radial hole 22 and holes 25, 26. Further, a radial hole 29 of a secondary piston 28 is in a position behind a cup seal 30 so that the secondary chamber 31 communicates with the master-cylinder reservoir 27 through radial holes 29 and passages 32, 33. Therefore, no master cylinder pressure is developed in the primary chamber 24 and the secondary chamber 31.

Upon depression of the brake pedal for braking operation, the input shaft 3, the cylindrical stopper member 20, and the cylindrical member 8a advance so that the valve ball 5 is seated on the second valve seat 8 and is spaced apart from the first valve seat 7, thereby switching the control valve 4. Therefore, the power chamber 9 is isolated from the booster reservoir, which is always in communication with the axial hole 10 of the cylindrical member 8a, and communicates with the input port 18, whereby hydraulic fluid is introduced into the power chamber 9 from the fluid pressure source. By the hydraulic fluid introduced into the power chamber 9, the power piston 6 advances so that the brake fluid pressure boosting device 1 outputs. Then, the primary piston 21 advances such that the radial hole 22 passes the cup seal 23, thereby isolating the primary chamber 24 from the master-cylinder reservoir 27. As a result, master cylinder pressure is developed in the primary chamber 24.

At the same time, the hydraulic fluid in the power chamber 9 is introduced into both wheel cylinders of one circuit of the brake system through a hole 34 formed in the housing 15. Because of the master cylinder pressure developed in the primary chamber 24, the secondary piston 28 advances such that its radial hole 29 passes the cup seal 30, thereby isolating the secondary chamber 31 from the master-cylinder reservoir 27. As a result, master cylinder pressure is developed in the secondary chamber 31 too. The master cylinder pressure developed in the secondary chamber 31 is introduced into both wheel cylinders of the other circuit of the brake system from a secondary output port 35.

As mentioned above, the inner pressure of the power chamber 9, and the respective master cylinder pressures of the primary chamber 24 and the secondary chamber 31 are equal to each other so that hydraulic fluid at the same fluid pressure is supplied to the respective wheel cylinders. That is, braking pressures at the two circuits of the brake system are equal to each other. The hydraulic fluid in the power chamber 9 is also introduced into a chamber 37 through an axial hole 36. By the fluid pressure in the chamber 37, a valve member 38 supporting the valve ball 5 is biased in a direction against the input of the input shaft 3.

Because of the fluid pressure in the power chamber 9, the reaction piston 19 is shifted to the right relative to the power piston 6 and the input shaft 3 against the spring force of the spring 39. Since loss strokes exist in the respective wheel cylinders, however, no braking force is substantially produced by the wheel cylinders at an initial operational stage. In this initial operational stage, the rear end (the right end in FIG. 4) 19*a* of the reaction piston 19 moves to such a position before the step 3*a* of the input shaft 3. Therefore, the rear end 19*a* of the reaction piston 19 does not come in contact with the step 3*a* of the input shaft 3 so that no force is exerted on the input shaft 3 from the reaction piston 19. Therefore, exerted on the input shaft 3 is a small force which is received by relatively small effective pressure receiving areas of the cylindrical stopper member 20 and the cylindrical member 8*a* located at the end of the input shaft 3. This small force is transmitted as a reaction force to a driver.

As the reaction force on the input shaft 3 becomes equal to the input on the input shaft 3, the valve ball 5 is seated on both of the first valve seat 7 and the second valve seat 8 so that the power chamber 9 is isolated from both of the fluid pressure source and the booster reservoir. As the input of the input shaft 3 further increases, the valve ball 5 is again spaced apart from the first valve seat 7 so that the hydraulic fluid from the fluid pressure source is supplied in the power chamber 9 to further increase the fluid pressure in the power chamber 9. After that, the seating and separating motion of the valve ball 5 relative to the first valve seat 7 is repeated so as to successively increase the fluid pressure in the power chamber 9 at a predetermined boosting rate according to the increase in the input of the input shaft 3.

During the loss strokes of the respective wheel cylinders, since the rear end 19*a* of the reaction piston 19 is not in contact with the step 3*a* of the input shaft 3, the effective pressure receiving area of the input shaft 3 on which the fluid pressure in the power chamber 9 acts is small so that the boosting rate is high. Therefore, the output of the brake fluid pressure boosting device 1 is significantly increased at this high boosting rate relative to the input of the input shaft 3, that is, the brake fluid pressure boosting device 1 performs so-called jumping action.

As the power piston 6 further advances by the further increase in the fluid pressure in the power chamber 9 to cancel the loss strokes of the wheel cylinders, the respective wheel cylinders substantially develop braking forces so that the brakes of the two circuits of the brake system are substantially operated. In this state, the rear end 19*a* of the reaction piston 19 is in contact with the step 3*a* of the input shaft 3 because of the increased fluid pressure in the power chamber 9 and, because of biasing force produced by the fluid pressure in the power chamber 9, the reaction piston 19 applies force to the input shaft 3 against the input of the input shaft 3. Therefore, the reaction force acting on the input shaft 3 is increased and the output of the brake fluid pressure boosting device 1 is increased at an boosting rate, lower than that during the loss strokes, relative to the input of the input shat 3. That is, the jumping action is ended.

After that, since the reaction force is increased, the brake fluid pressure boosting device 1 boosts the input of the input shaft 3 at a normal and relatively low increasing ratio and the fluid pressure in the power chamber 9 becomes fluid pressure corresponding to this boosting rate. The hydraulic fluid of the power chamber 9 is supplied to the wheel cylinders of the one circuit, while the master cylinder 2 develops master cylinder pressure by the output of the brake fluid pressure boosting device 1 and the master cylinder pressure developed in the secondary chamber 31 is supplied to the wheel cylinders of the other circuit. Accordingly, the respective wheel cylinders of the two circuits generate large braking force relative to the input of the input shaft 3 so that the brakes are operated by this braking force.

As the brake pedal is released to cancel the operation of the brakes, the input shaft 3, the cylindrical stopper member 20, and the cylindrical member 8*a* move rearward to the right. As mentioned above, the second valve seat 8 of the control valve 4 is spaced apart from the valve ball 5 so that the power chamber 9 communicates with the axial hole 10, i.e. the booster reservoir to discharge the hydraulic fluid out of the power chamber 9 to the booster reservoir.

Because of the discharge of the hydraulic fluid out of the power chamber 9, the hydraulic fluid in the wheel cylinders of the one circuit are also rapidly discharged to the booster reservoir through the power chamber 9. In addition, the primary piston 21, the secondary piston 28, and the power piston 6 are rapidly moved rearward by the spring force of the primary return spring 40 and the secondary return spring 41. By the rearward movement of the primary piston 21 and the secondary piston 28, the radial holes 29 and 22 pass the cup seals 30 and 23 to be positioned behind the cup seals 30 and 23, respectively so that both the primary chamber 24 and the secondary chamber 31 communicate with the master-cylinder reservoir 27. Therefore, hydraulic fluid in the wheel cylinders of the other circuit is also discharged to the master cylinder reservoir 27 through the secondary chamber 31. Therefore, the operation of brakes of the both circuits is rapidly cancelled.

As the fluid pressure in the power chamber 9 is decreased to a predetermined pressure, the reaction piston 19 moves forward relative to the power piston 6 and the input shaft 3 by the spring force of the spring 39, whereby the reaction piston 19 comes in contact with a flange of a valve seat member 7*a* composing the first valve seat 7 provided on the power piston 6 and the rear end 19*a* of the reaction piston 19 is spaced apart from the step 3*a* of the input shaft 3.

As the rear end of the power piston 6 comes in contact with the plug 13 as shown in FIG. 4, the rearward movement of the power piston 6 is stopped, so the power piston 6 is in its inoperative position. Accordingly, the rearward movement of the primary piston 21 and the secondary piston 28 of the master cylinder 2 is also stopped, so the primary piston 21 and the secondary piston 28 are in their inoperative positions. In this manner, the operation of the brakes are rapidly cancelled.

In case that no hydraulic fluid is supplied to the power chamber 9 from the fluid pressure source during the braking operation due to failure of fluid pressure source, as the input piston 8 is moved forward by depression of the brake pedal, the cylindrical member 8*a* comes in contact with the valve ball 5 similarly to the aforementioned normal case and presses the valve member 38 via the valve ball 5. Then, the stopping portion 20*a* of the cylindrical stopper member 20 comes in contact with the flange of the valve seat member 7*a* of the first valve seat 7. As a result, the input shaft 3 directly presses the primary piston 21 via the cylindrical stopper member 20, the valve seat member 7*a,* the power piston 6, and an adjusting member 42, thereby moving the primary piston 21 forward. Therefore, the radial hole 22 advances to the front side of the cup seal 23 so that master cylinder pressure is developed in the primary chamber 24 similarly to the aforementioned normal case. By the master cylinder pressure in the primary chamber 24, the secondary piston 28 is moved forward and the radial hole 29 advances to the front side of the cup seal 30 so that the master cylinder pressure is developed in the secondary chamber 31. The master cylinder pressures in the primary chamber 24 and the secondary chamber 31 are supplied to the wheel cylinders of the two circuits of the brake system through the primary output port 43 and the secondary output port 35, respectively, thereby operating the brakes of the two circuits of the brake system. In this manner, even in case of the fluid pressure source failure i.e. pump failure, the brakes of the two circuits of the brake system can be securely operated. In this case, the characteristic of the brake fluid pressure boosting device is indicated by a solid straight line without any boost in FIG. 3.

The aforementioned conventional brake fluid pressure boosting device 1 with the jumping characteristic by the reaction piston 19 in which the control valve 4 having the valve ball 5 is arranged in the power piston 6 however has problems that the structure for attaining the jumping characteristic is complex because special parts for attaining the jumping characteristic such as the reaction piston 19 slidably disposed to the input shaft 3 and the spring 39 for biasing the reaction piston 19 should be employed, and that the cost is high because of these special parts.

To solve these problems, instead of the reaction piston 19 and the spring 39, a reaction mechanism composed of a reaction disk made of an elastic material such as rubber which is conventionally known to be used in a vacuum boosting device may be employed in this brake fluid pressure boosting device 1. However, for achieving this arrangement, the input shaft 3 should be designed to penetrate the valve ball 5 and rigidity for transmitting the reaction force to the input shaft 3 is also required. That is, it is difficult to employ the reaction mechanism composed of the reaction disk.

There is another problem that the structure for the control valve 4 is complex. Since fluid pressure in the power chamber 9 acts on the valve ball 5 of the control valve 4 during operation, hydraulic fluid of the power chamber 9 is introduced into the chamber 37 so as to make the fluid pressure of the chamber 37 to act on the valve member 38 in order to prevent the valve ball 5 from being spaced apart from the second valve seat 8, thus making the structure for the control valve 4 complex.

There is further another problem that the passage for discharging hydraulic fluid out of the power chamber 9 is complex because the holes 10, 11, 12, 14, and 16 composing the passage for discharging hydraulic fluid are formed in the cylindrical member 8a, the input shaft 3, the plug 13, and the housing 15, respectively.

SUMMARY OF THE INVENTION

It is an object of the present invention to provide a fluid pressure boosting device of a center valve type of which the structure for attaining the jumping characteristic and the structure of passage for discharging hydraulic fluid are simple.

To achieve the aforementioned object, the present invention provides a fluid pressure boosting device, for boosting an input by fluid pressure to output the boosted pressure, comprising at least a power chamber to which hydraulic fluid from a fluid pressure source is supplied during operation, a power piston which is actuated by fluid pressure of said power chamber to output, a control valve which is arranged inside said power piston to control the supply and discharge of the hydraulic fluid of said power chamber, and an input shaft for operating said control valve according to the input, said fluid pressure boosting device being characterized in that said control valve comprises a supply valve which stops the supply of hydraulic fluid from said fluid pressure source to said power chamber in the inoperative state and allows the supply of hydraulic fluid from said fluid pressure source to said power chamber according to said input in the operative state, and a discharge valve which allows the discharge of hydraulic fluid of said power chamber in the inoperative state and stops the discharge of hydraulic fluid of said power chamber in the operative state, wherein said supply valve has an annular poppet valve element supported by a cylindrical supply valve member which is slidably arranged in said power piston and a supply valve seat which is arranged in said power piston and in which said poppet valve element can be seated, and said discharge valve has an annular poppet valve element supported by a cylindrical discharge valve member disposed integrally with said supply valve member and a discharge valve seat which is disposed to move together with said input shaft and to which the latter poppet valve element can be seated, and that said input shaft extends to penetrate said supply valve and said discharge valve in the axial direction and is arranged such that, in the inoperative state, an end of said input shaft confronts the reaction disk arranged in an output-side member with a predetermined space therebetween and, in the operative state and when producing a predetermined output, the end of said input shaft comes in contact with said reaction disk so that a reaction force is transmitted from said reaction disk to said input shaft.

The present invention is characterized in that said output-side member is said power piston or a piston of a master cylinder which is actuated by said power piston.

The present invention is characterized in that a passage for discharging hydraulic fluid of said power chamber is composed of annular passages which are formed between an outer surface of said input shaft and an inner surface of said supply valve member, between the outer surface of said input shaft and an inner surface of said discharge valve member, and between the outer surface of said input shaft and an inner surface of the poppet valve element supported by said discharge valve member.

According to the fluid pressure boosting device of the present invention having the aforementioned structure, a control valve is composed of a two-element-two-seat control valve of a poppet valve type, the front end of an input shaft penetrating the control valve is arranged to confront a reaction disk with a predetermined space therebetween in the inoperative state, the reaction disk being disposed in an output-side member, and to come in contact with the reaction disk in the operative state, thereby ensuring well fluid tightness (sealing property) and shortening the loss strokes. In addition, the reaction disk which is cheap is used for attaining the jumping characteristic, thereby simplifying the structure for attaining the jumping characteristic, and manufacturing the fluid pressure boosting device at a low cost.

In particular, according to the present invention, the discharging passage for discharging hydraulic fluid of a power chamber is composed of annular passages which are formed between the outer surface of an input shaft and the inner surface of a supply valve member, between the outer surface of the input shaft and the inner surface of a discharge valve member, and between the outer surface of said input shaft and the inner surface of the poppet valve element supported by the discharge valve member. Since the annular passages are normally formed at the discharge side, i.e. the side of a reservoir to which hydraulic fluid of the power chamber is discharged, the discharging passage directly extends to the reservoir side. Therefore, unlike the conventional example, the discharging passage is not required to extend toward the input side, thereby further securely simplifying the structure of the discharging passage.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is a sectional view showing a brake fluid pressure boosting device to which an embodiment of the fluid pressure boosting device of the present invention is adopted;

DESCRIPTION OF THE PREFERRED EMBODIMENTS

Hereinafter, an embodiment of the present invention will now be described with reference to drawings.

Figure 1:
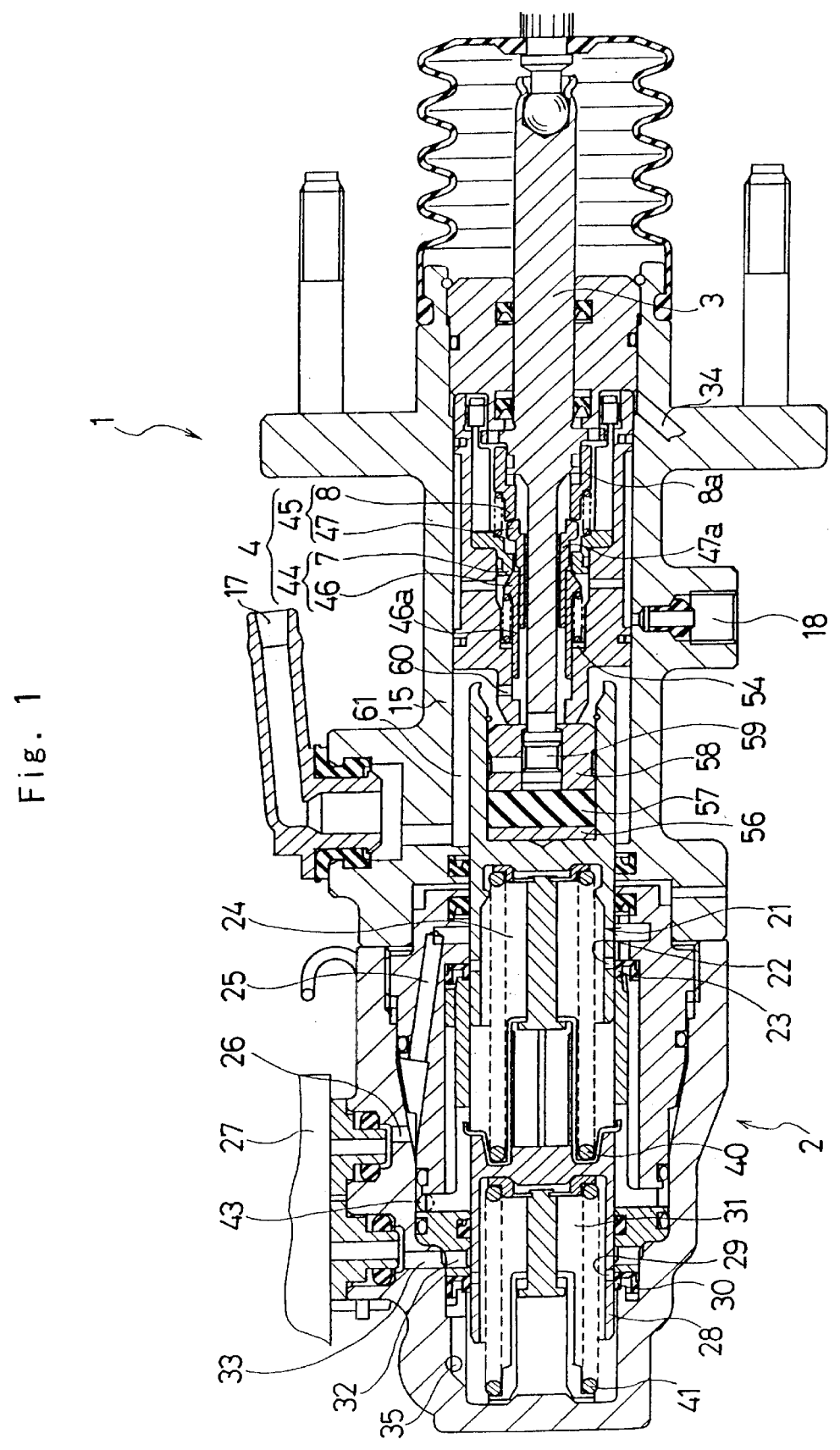
Figure 2:
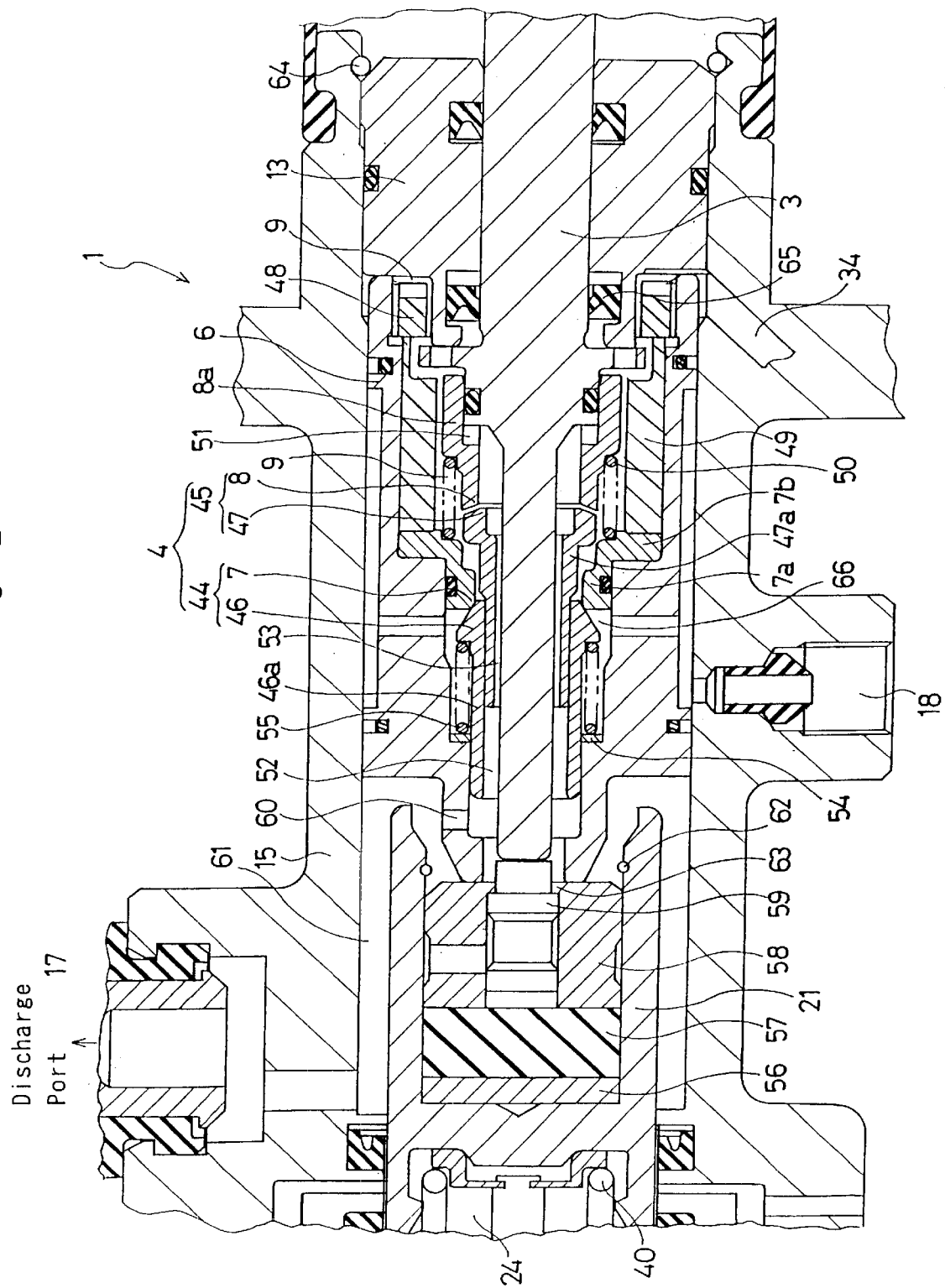
FIG. 2 is a partially enlarged sectional view showing a section of the brake fluid pressure boosting device shown in FIG. 1.
Figure 3:
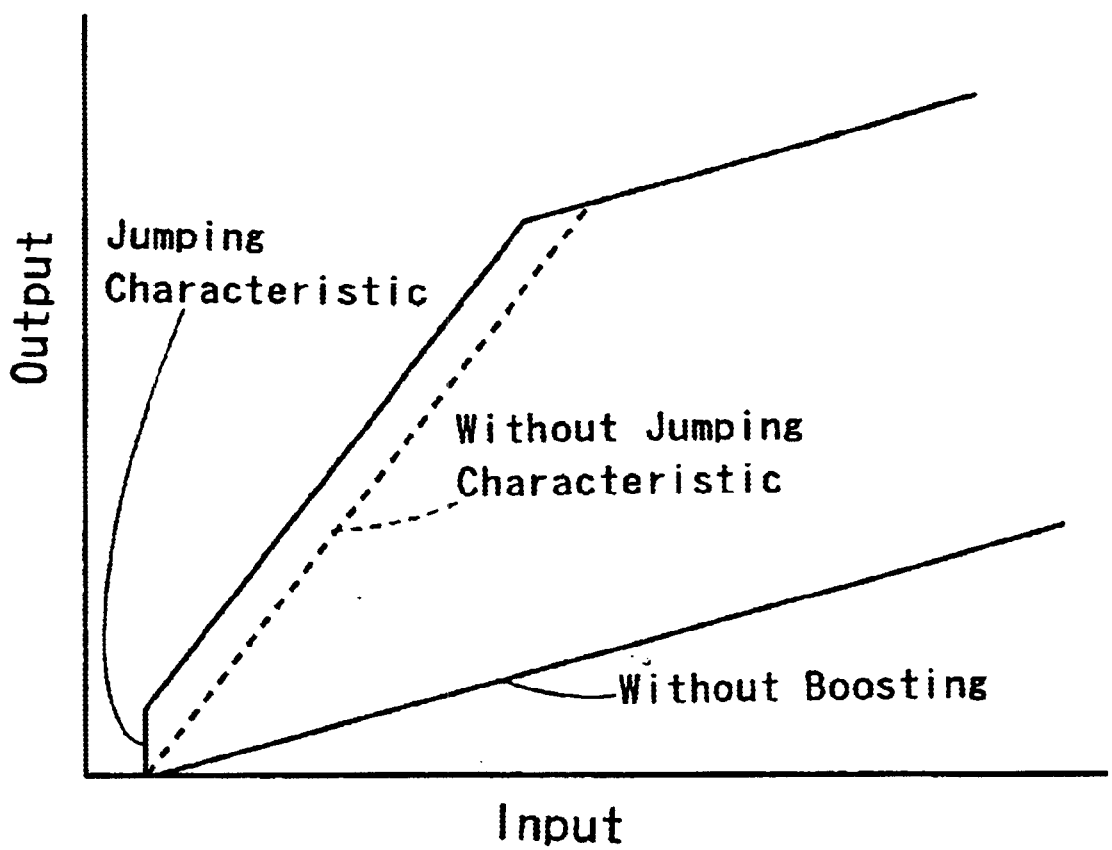
FIG. 3 is a graph showing characteristics of a conventional fluid pressure boosting device.
Figure 4:
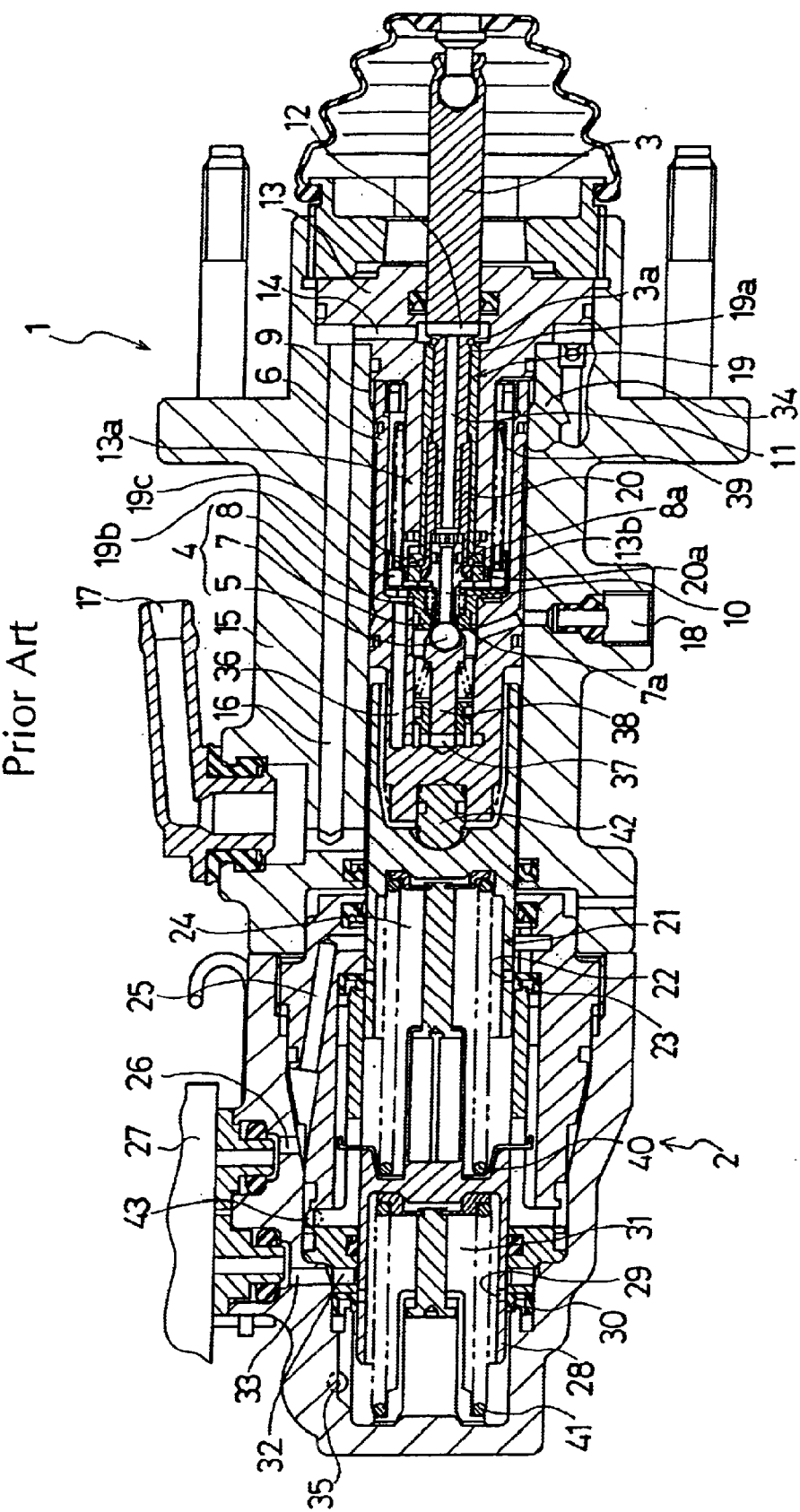
FIG. 4 is a sectional view showing a brake fluid pressure boosting device as an example of the conventional fluid pressure boosting device.

FIG. 1 is a sectional view showing a brake fluid pressure boosting device to which an embodiment of the fluid pressure boosting device of the present invention is adopted and FIG. 2 is a partially enlarged sectional view showing a section of the brake fluid pressure boosting device shown in FIG. 1. It should be noted that component parts similar or corresponding to the parts of the conventional example are designated with the same reference numeral, thus omitting the detail description of such component parts.

As shown in FIG. 1, a brake fluid pressure boosting device 1 of this embodiment is of a center valve type in which a control valve 4 is disposed on a power piston 6 similarly to the conventional example. The control valve 4 is of a two-element-two-seat type. That is, the control valve 4 comprises a supply valve 44 and a discharge valve 45. The supply valve 44 is composed of a poppet type annular valve cone (corresponding to "poppet valve element" of the present invention) 46 and an annular first valve seat (hereinafter, sometimes referred to as "supply valve seat") 7, and the discharge valve 45 is composed of a poppet type annular valve cone (corresponding to "poppet valve element" of the present invention) 47 and an annular second valve seat (hereinafter, sometimes referred to as "discharge valve seat") 8.

A cylindrical member 49 is pressed forward in the axial direction (to the left in FIG. 1 and FIG. 2) by a nut 48 threaded in and thus connected to the power piston 6. A flange 7b of a valve seat member 7a having the supply valve seat 7 is pressed against a step of the power piston 6 by the cylindrical member 49, whereby the valve seat member 7a is fixed to the power piston 6. A cylindrical member 8a having the discharge valve seat 8 is fluid-tightly and slidably fitted around the input shaft 3 and is always biased rearward (to the right in FIG. 1 and FIG. 2) against the input shaft 3 by a spring 50. The cylindrical member 8a is positioned relative to the input shaft 3 in the axial direction by an annular spacer 51 which is fitted into the cylindrical member 8a, thereby defining a space between a discharge valve member 47a and the discharge valve seat 8 in the inoperative state. In this case, various spacers 51 having different axial length are prepared. By selecting a suitable one of the spacers 51, the positioning by the spacer 51 relative to the input shaft 3 is adjustable, thereby allowing the adjustment of the space between the discharge valve member 47a and the discharge valve seat 8 in the inoperative state.

On the other hand, a supply valve member 46a supporting the valve cone 46 of the supply valve 44 is formed in a cylindrical shape and is slidably fitted in an axial bore of the power piston 6. In addition, the supply valve member 46 is arranged around the input shaft 3 so as to form an axial annular passage 52 between the outer surface of the input shaft 3 and the inner surface of the supply valve member 46a. The discharge valve member 47a having the valve cone 47 of the discharge valve 45 is formed in a cylindrical shape and is inserted and fixed in axial bores of the valve cone 46 and the supply valve member 46a. In this case, the outer periphery of the discharge valve member 47a is stepped to have a large-diameter portion and a small-diameter portion. The small-diameter portion of the discharge valve member 47a is pressingly inserted in the axial bore of the supply valve member 46a so that the supply valve member 46a and the discharge valve member 47a are made just like an integral part. The discharge valve member 47a is arranged around the input shaft 3 so as to form an axial annular passage 53 between the outer surface of the input shaft 3 and the inner surface of the discharge valve member 47a. The annular passage 53 is in communication at its rear end with a space between the valve cone 47 and the second valve seat 8 and is in communication at its front end with the annular passage 52.

An annular sealing member 54 is arranged in the axial bore of the power piston 6 for attaining the sealing between the outer surface of the supply valve member 46a and the inner surface of the power piston 6 in a range where the supply valve member 46a slides. The supply valve member 46a slidably penetrates the sealing member 54. The supply valve member 46a and the discharge valve member 47a are always biased by a spring 55 compressed between the sealing member 54 and the valve cone 46 in such a direction that the valve cone 46 is seated on the first valve seat 7.

Fitted in a cylindrical rear portion of a primary piston 21 of a master cylinder 2 are a disk plate 56 which is made of a metal and a reaction disk 57 which is made of an elastic material such as rubber. By suitably adjusting the thickness (the length in the axial direction) of the disk plate 56, the loss strokes of the primary piston 21 and a secondary piston 28 of the master cylinder 2 (that is, piston strokes of the pistons 21, 28 until their radial holes 22, 29 pass cup seals 23, 30, respectively) are adjustable.

Further, a cylindrical output transmitting member 58 is slidably fitted in the cylindrical rear portion of the primary piston 21. The rear end (the right end in FIG. 1 and FIG. 2) of the output transmitting member 58 is in contact with the front end (the left end in FIG. 1 and FIG. 2) of the power piston 6 and the front end of the output transmitting member 58 is in contact with the rear end of a peripheral portion of the reaction disk 57.

Furthermore, a column-like reaction transmitting member 59 is slidably fitted in the output transmitting member 58. The rear end of the reaction transmitting member 59 is in contact with the front end of the input shaft 3 and the front end of the reaction transmitting member 59 confronts the rear end of a central portion of the reaction disk 57 with a predetermined space therebetween. This space attains the jumping characteristic of the brake fluid pressure boosting device 1. The axial length of the space can be adjusted by suitably adjusting the axial length of the reaction transmitting member 59, thereby adjusting a jumping amount according to the jumping characteristic. The output transmitting member 58 is formed with a radial hole allowing the communication between the inner surface and the outer surface thereof in order to prevent abrasion particles of the reaction disk 57 from entering to the control valve 4.

In the conventional brake fluid pressure boosting device, the passage for discharging hydraulic fluid is composed of the holes 10, 11, 12, 14, and 16 so that hydraulic fluid first flows rearward and then flows forward. In this embodiment, a radial hole 60 is formed in a front end portion of the power piston 6 so that the radial hole 60 is always in communication with the annular passage 52, and an annular space 61 is formed between the inner surface of the axial bore of the housing 15 and the outer surface of a rear end portion of the primary piston 21 so that the annular space 61 is always in communication with the radial hole 60 and is always in communication with the discharge port 17. Therefore, in the brake fluid pressure boosting device 1 of this embodiment, the passage for discharging hydraulic fluid is composed of two annular passages 53, 52, the radial hole 60, and the annular space 61.

In the inoperative state of the brake fluid pressure boosting device 1, as shown in FIG. 1 and FIG. 2, the valve cone 46 is seated in the first valve seat 7 and the valve cone 47 is spaced apart from the second valve seat 8 so that the power chamber 9 is isolated from the input port 18 and communicates with a booster reservoir (not shown) through the space between the valve cone 47 and the second valve seat 8, the two annular passages 53, 52, the radial hole 60, the annular space 61, and the discharge port 17.

By the way, the seat diameter of the supply valve 44 (i.e. the diameter at a position where the valve cone 46 is seated in the first valve seat 7), the seat diameter of the discharge valve 45 (i.e. the diameter at a position where the valve cone 47 is seated in the second valve seat 8), the outer diameter of the supply valve member 46a, the diameter of the input shaft 3 at a portion which fluid-tightly penetrates a cup seal 65 for sealing the power chamber 9 from the outside are all set to be equal. When fluid pressure of the fluid pressure source and fluid pressure of the power chamber 9 act on the control valve 4 and the input shaft 3, this arrangement prevents a force in the axial direction from being developed by the fluid pressures so that the reaction force acting on the input shaft 3 is a reaction force only from the reaction disk 57.

A retaining ring 62 is attached inside a cylindrical rear end portion of the primary piston 21. By the retaining ring 62, the output transmitting member 58, the reaction disk 57, and the disk plate 56 are prevented from coming off. The output transmitting member 58 is provided at its rear end with a flange 63. By the flange 63, the reaction transmitting member 59 is prevented from coming off. A ring retainer 64 is attached to an inner surface of the axial bore of the housing 15. By the ring retainer 64, the plug 13 is fixed in the axial direction of the housing 15 and is prevented from coming off.

The other structure of the brake fluid pressure boosting device 1 and the structure of the master cylinder 2 actuated by the brake fluid pressure boosting device 1 of the this embodiment are the same as those of the aforementioned conventional example.

The actions of the brake fluid pressure boosting device 1 of this embodiment having the aforementioned structure will now be described.

In the inoperative state as shown in FIG. 1 and FIG. 2, the supply valve 44 is closed and the discharge valve 45 is opened so that the power chamber 9 is in communication with the booster reservoir and is therefore held at atmospheric pressure as mentioned above. In this state, the primary piston 21 and the secondary piston 28 of the master cylinder 2 are biased rearward by return springs 40, 41 so that the output transmitting member 59 is in contact with the front end of the power piston 6. In addition, the rear end of the power piston 6 is in contact with the plug 13. Accordingly, the power piston 6 does not work and the brake fluid pressure boosting device 1 therefore does not output. This means that the master cylinder 2 does not work and no master cylinder pressure is developed.

As the input shaft 3 is moved forward (leftward) upon depression of the brake pedal, the discharge valve seat 8 comes in contact with the valve cone 47 of the discharge valve member 47a so as to close the discharge valve 45, while the valve cone 46 of the supply valve member 46a is spaced apart from the supply valve seat 7 so as to open the supply valve 44. Then, hydraulic fluid from the fluid pressure source (not shown), which has been supplied in the supply chamber 66 of the brake fluid pressure boosting device 1 through the input port 18, is supplied into the power chamber 9 through the open supply valve 44 and an annular space between the inner surface of the supply valve seat member 7a and the outer surface of the large-diameter portion of the discharge valve member 47a. By the hydraulic fluid in the power chamber 9, the power piston 6 is moved forward and the primary piston 21 is moved forward via the output transmitting member 58 and the reaction disk 57. Accordingly, similarly to the aforementioned conventional example, master cylinder pressures are developed in the primary chambers 24 and the secondary chamber 31, respectively.

A reaction force generated by the master cylinder pressure of the primary chamber 24 is transmitted to the reaction disk 57 through the primary piston 21 and the disk plate 56. In the initial stage of operation of the brake fluid pressure boosting device 1, even though the reaction transmitting member 59 is moved forward by the forward movement of the input shaft 3, the reaction force transmitted to the reaction disk 57 is not transmitted to the input shaft 3 because there is a space between the reaction disk 57 and the reaction transmitting member 59. In this state, the output of the brake fluid pressure boosting device 1 is increased.

According to the increase in the output of the brake fluid pressure boosting device 1, the force of the power piston 6 pressing the reaction disk 57 is increased via the output transmitting member 58, whereby the elastic deformation of the reaction disk 57 is increased. The reaction disk 57 being deformed enters into the axial hole of the output transmitting member 58 to gradually fill the aforementioned space. As the space is filled with the reaction disk 57, the reaction force from the reaction disk 57 starts to be transmitted to the input shaft 3.

Therefore, a part of the reaction force transmitted to the reaction disk 57 is transmitted to the power piston 6 via the output transmitting member 58 and the other part of the reaction force is transmitted to the input shaft 3 via the reaction transmitting member 59. The hydraulic fluid in the power chamber 9 is controlled by the supply valve 44 and the discharge valve 45 such that the input on the input shaft 3 from the brake pedal and the reaction force on the input shaft 3 from the reaction disk 57 balance.

Since the seat diameter of the supply valve 44, the seat diameter of the discharge valve 45, the outer diameter of the supply valve member 46a, the diameter of the input shaft 3 at a portion which fluid-tightly penetrates the cup seal 65 for sealing the power chamber 9 from the outside are all set to be equal, neither fluid pressure of the fluid pressure source nor fluid pressure of the power chamber 9 when acting on the control valve 4 and the input shaft 3 generates force in the axial direction. Therefore, the reaction force acting on the input shaft 3 is only the reaction force from the reaction disk 57.

The ratio of the pressure receiving area of the output transmitting member 58 and the pressure receiving area of the reaction transmitting member 59 is the boosting ratio of the brake pressure boosting device 1. The input of the input shaft 3 is boosted by this boosting ratio into a large output to actuate the primary piston 21 of the master cylinder 2, thereby largely increasing the master cylinder pressures in the primary chamber 24 and the secondary chamber 31.

Similarly to the aforementioned conventional example, the hydraulic fluid supplied to the power chamber is supplied to wheel cylinders of one circuit of the brake system through a passage 34, while the master cylinder pressure developed in the secondary chamber 31 of the master cylinder 2 is supplied to wheel cylinders of the other circuit of the brake system, thereby operating the service braking.

In this manner, the period that reaction force is not transmitted to the input shaft 3 in the initial operational stage is set. Only the output is increased with constant input during this period, thereby exhibiting the jumping characteristic.

According to the brake fluid pressure boosting device 1 of this embodiment, the control valve 4 is composed of a two-element-two-seat control valve of a poppet valve type, the reaction disk 57 is disposed in the primary piston 21 of the master cylinder 2, and the front end of the input shaft 3 is arranged to confront the reaction disk 57, thereby ensuring well fluid tightness (sealing property) and shortening the loss strokes. In addition, the reaction disk 57 which is cheap is used for attaining the jumping characteristic, thereby simplifying the structure for attaining the jumping characteristic, and manufacturing the brake fluid pressure boosting device 1 at a low cost.

Further, the discharging passage for discharging hydraulic fluid of the power chamber 9 is composed of the annular passages 52 and 53 which are formed between the outer surface of the input shaft 3 and the inner surface of the supply valve member 46a, between the outer surface of the input shaft 3 and the inner surface of the discharge valve member 47a, and between the outer surface of the input shaft 3 and the inner surface of the poppet type valve cone 47 supported by the discharge valve member 47a. Since the annular passages 52, 53 are formed at the discharge side, i.e. the side of the discharge port 17 communicating with the booster reservoir to which hydraulic fluid of the power chamber 9 is discharged, the discharging passage directly extends to the discharge port 17. Therefore, unlike the conventional example, the discharging passage does not extend toward the input side, thereby simplifying the structure of the discharging passage.

The other actions, works, and effects of the brake fluid pressure boosting device 1 of this embodiment are the same as those of the conventional example.

Though the brake fluid pressure boosting device 1 of the aforementioned embodiment is adopted to a semi-full-power brake system in which the fluid pressure of the power chamber 9 is supplied to the wheel cylinders of one circuit and the master cylinder pressure is supplied to the wheel cylinders of the other circuit, the fluid pressure boosting device 1 of the present invention can be adopted to a brake system in which fluid pressure of a power chamber 9 is used only for actuating a power piston 6 not being supplied to wheel cylinders, master cylinder pressure of a primary chamber 24 is supplied to the wheel cylinders of one circuit, and master cylinder pressure of a secondary chamber 31 is supplied to wheel cylinders of the other circuit.

Further, though the reaction disk 57 composing the reaction mechanism is provided in the primary piston 21 of the master cylinder 2 in the brake fluid pressure boosting device 1 of the aforementioned embodiment, the reaction disk 57 may be provided in the power piston 6.

Furthermore, the fluid pressure boosting device of the present invention may be adopted to another fluid pressure boosting device not for brakes.

As apparent from the aforementioned description, according to the fluid pressure boosting device of the present invention, a control valve is composed of a two-element-two-seat control valve of a poppet valve type, the front end of an input shaft is arranged to confront a reaction disk with a predetermined space therebetween in the inoperative state, the reaction disk being disposed in an output-side member, and to come in contact with the reaction disk in the operative state, thereby ensuring well fluid tightness (sealing property) and shortening the loss strokes. In addition, the reaction disk which is cheap is used for attaining the jumping characteristic, thereby simplifying the structure for attaining the jumping characteristic, and manufacturing the fluid pressure boosting device at a low cost.

In particular, according to the present invention, the discharging passage for discharging hydraulic fluid of a power chamber is composed of annular passages which are formed between the outer surface of an input shaft and the inner surface of a supply valve member, between the outer surface of the input shaft and the inner surface of a discharge valve member, and between the outer surface of the input shaft and the inner surface of a poppet type valve cone supported by the discharge valve member. Since the annular passages are normally formed at the discharge side, i.e. the side of a reservoir to which hydraulic fluid of the power chamber is discharged, the discharging passage directly extends to the reservoir side. Therefore, unlike the conventional example, the discharging passage is not required to extend toward the input side, thereby further securely simplifying the structure of the discharging passage.

What we claim is:

1. A fluid pressure boosting device, for boosting an input by fluid pressure to output the boosted pressure, comprising at least a power chamber to which hydraulic fluid from a fluid pressure source is supplied during operation, a power piston which is actuated by fluid pressure of said power chamber to output, a control valve which is arranged inside said power piston to control the supply and discharge of the hydraulic fluid of said power chamber, and an input shaft for operating said control valve according to the input, said fluid pressure boosting device being characterized in that said control valve comprises a supply valve which stops the supply of hydraulic fluid from said fluid pressure source to said power chamber in the inoperative state and allows the supply of hydraulic fluid from said fluid pressure source to said power chamber according to said input in the operative state, and a discharge valve which allows the discharge of hydraulic fluid of said power chamber in the inoperative state and stops the discharge of hydraulic fluid of said power chamber in the operative state, wherein said supply valve has an annular poppet valve element supported by a cylindrical supply valve member which is slidably arranged in said power piston and a supply valve seat which is arranged in said power piston and in which said poppet valve element can be seated, and said discharge valve has an annular poppet valve element supported by a cylindrical discharge valve member disposed integrally with said supply valve member and a discharge valve seat which is disposed to move together with said input shaft and to which the latter poppet valve element can be seated, and that said input shaft extends to penetrate said supply valve and said discharge valve in the axial direction and is arranged such that, in the inoperative state, an end of said input shaft confronts the reaction disk arranged in an output-side member with a predetermined space therebetween and, in the operative state and when producing a predetermined output, the end of said input shaft comes in contact with said reaction disk so that a reaction force is transmitted from said reaction disk to said input shaft.

2. A fluid pressure boosting device as claimed in claim 1, being characterized in that said output-side member is said power piston or a piston of a master cylinder which is actuated by said power piston.

3. A fluid pressure boosting device as claimed in claim 1, being characterized in that a passage for discharging hydraulic fluid of said power chamber is composed of annular passages which are formed between an outer surface of said input shaft and an inner surface of said supply valve member, between the outer surface of said input shaft and an inner surface of said discharge valve member, and between the outer surface of said input shaft and an inner surface of the poppet valve element supported by said discharge valve member.

4. A fluid pressure boosting device as claimed in claim 2, being characterized in that a passage for discharging hydraulic fluid of said power chamber is composed of annular passages which are formed between an outer surface of said input shaft and an inner surface of said supply valve member, between the outer surface of said input shaft and an inner surface of said discharge valve member, and between the outer surface of said input shaft and an inner surface of the poppet valve element supported by said discharge valve member.

* * * * *